(12) United States Patent
Bhowal et al.

(10) Patent No.: US 8,209,845 B2
(45) Date of Patent: Jul. 3, 2012

(54) MACHINED COMPONENT MANUFACTURING METHOD FOR ENHANCED LOW CYCLE FATIGUE LIFE

(75) Inventors: Prabir R. Bhowal, Rocky Hill, CT (US); Agnieszka M. Wusatowska-Sarnek, Mansfield Center, CT (US)

(73) Assignee: United Technologies Corporation, Hartford, CT (US)

( * ) Notice: Subject to any disclaimer, the term of this patent is extended or adjusted under 35 U.S.C. 154(b) by 790 days.

(21) Appl. No.: 12/277,551

(22) Filed: Nov. 25, 2008

(65) Prior Publication Data

US 2010/0126635 A1   May 27, 2010

(51) Int. Cl.
*B23P 13/04* (2006.01)
*C22C 32/00* (2006.01)

(52) U.S. Cl. .......................... 29/557; 148/405

(58) Field of Classification Search .............. 29/557, 29/558, 402.01, 402.06, 402.04; 148/405; 451/28, 36; 134/6
See application file for complete search history.

(56) References Cited

U.S. PATENT DOCUMENTS

| | | | |
|---|---|---|---|
| 4,026,779 A | 5/1977 | Shaw | |
| 4,454,740 A | 6/1984 | Neal et al. | |
| 4,512,115 A | 4/1985 | Miller | |
| 4,536,932 A | 8/1985 | Athey | |
| 4,645,561 A | 2/1987 | Rea | |
| 5,492,550 A | 2/1996 | Krishnan et al. | |
| 6,171,711 B1 | 1/2001 | Draghi et al. | |
| 6,194,026 B1 | 2/2001 | Warnes et al. | |
| 6,331,217 B1 | 12/2001 | Burke et al. | |
| 6,571,472 B2 | 6/2003 | Berry et al. | |
| 6,805,750 B1 | 10/2004 | Ristau et al. | |
| 7,063,597 B2 | 6/2006 | Prabhu et al. | |
| 2005/0263171 A1 | 12/2005 | Wu et al. | |

FOREIGN PATENT DOCUMENTS

| JP | 06-145783 | 5/1994 |
|---|---|---|
| JP | 2001 335833 | 12/2001 |

OTHER PUBLICATIONS

Piearcey, B.J. et al., "The Carbide Phases in Mar-M200," Transaction of the Metallurgical Society of AIME, vol. 239, Apr. 1967, pp. 451-457, XP-002570260.
Lacaze et al., "Directionally Solidified Materials: Nickel-Base Superalloys for Gas Turbines," Textures and Microstructures, vol. 13, 1990, pp. 1-14, XP-002570261.
European Search Report for EP Application No. 09252671.4, Mar. 9, 2010.
Prabir R. Bhowal et al., "Carbides and Their Influence on Notched Low Cycle Fatigue Behavior of Fine-Grained IN718 Gas Turbine Disk Material", IN718 Superalloy Conference, Oct. 2005, Edited by TMS (The Minerals, Metals & Materials Society), 2005.
AMS Handbooks, vol. 5, Surface Engineering, "Barrel Finishing", AMS On-Line, 2002.
LaRoux K. Gillespie, "Deburring and Edge Finishing", SME Handbook, 1999.

*Primary Examiner* — John C Hong
(74) *Attorney, Agent, or Firm* — Carlson, Gaskey & Olds, P.C.

(57) ABSTRACT

A manufacturing method includes providing a component, such as a superalloy aircraft component, with a substrate surface having damaged brittle compound particles from machining. The manufacturing method removes the damaged compound particles from the substrate surface without producing significant amount of new damaged compound particles in the substrate surface. In one example, the damaged compound particles are removed with an abrasive media. The method results in a machined substrate surface free from damaged intermetallic component particles.

14 Claims, 1 Drawing Sheet

MACHINED COMPONENT MANUFACTURING METHOD FOR ENHANCED LOW CYCLE FATIGUE LIFE

BACKGROUND

This disclosure relates to a manufacturing method for improving low cycle fatigue life of machined components, such as aircraft components.

Many machined components, such as disks and rotating shafts of gas turbine engines, are made from superalloys, such as nickel. Some nickel superalloys include brittle compound particles, such as carbides or oxides.

Typically, these superalloy components are machined subsequent to a casting or forging process. A cutting tool can damage or crack the carbides and/or oxides during machining, which provides weakened sites at which fatigue cracks may initiate. Fatigue cracks result in reduced low cycle fatigue life that can significantly limit the service life of the component. Superalloy components having carbides and/or oxides that have been low-stress ground exhibit improved low cycle fatigue life. Low-stress grinding is quite time consuming and expensive. Furthermore, low-stress grinding can only be utilized on smooth, readily accessible surfaces and cannot be used on inaccessible features, such as notches, which are typical on most aircraft superalloy components. Accordingly, fatigue cracks may initiate at inaccessible, machined surfaces of superalloy components despite the use of low-stress grinding.

What is needed is improved low cycle fatigue life for superalloy components with brittle compound particles and machined surfaces.

SUMMARY

The disclosed method includes manufacturing a component, such as a superalloy aircraft component, by providing a substrate surface having damaged brittle compound particles from machining. The manufacturing method removes the damaged compound particles from the substrate surface without producing significant damaged compound particles. In one example, the damaged compound particles are removed with an abrasive media. For example, at least 0.0006 inch (0.01524 mm) of substrate surface is removed by the abrasive media. The method results in a machined substrate surface free from damaged compound particles.

These and other features of the disclosure can be best understood from the following specification and drawings, the following of which is a brief description.

DETAILED DESCRIPTION

Figure 1:
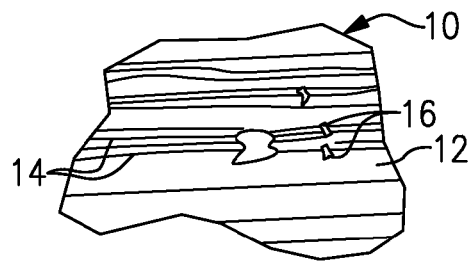
FIG. 1 is a simplified view of a machined substrate surface having damaged compound particles.

FIG. 1 depicts a component 10 having a substrate surface 12 that has been machined. The component 10 may be an aircraft component, such as a rotating disk or shaft or compressor rear seal of a gas turbine engine. In one example, the substrate is a nickel superalloy, such as Inconel 718. The substrate includes brittle compound particles, such as carbides or oxides, dispersed throughout, which is typical of such superalloys. Another example substrate is any steel of the type typically used in shafts and disks. Such steels typically include carbides.

Tool marks 14 produced by cutting tools during the machining process damage or crack the carbides and/or oxides 16. Example machining processes are lathe turning broaching, reaming, boring and milling. A typical median size of a cracked carbide may be approximately 0.0006-0.0008 inch (0.01524 mm-0.02032 mm). A large cracked carbide may be around 0.001 inch (0.0254 mm). The site of damaged compound particles can provide a location for early initiation of fatigue cracks, resulting in reduced low cycle fatigue life. Post-machining processing is desirable to counter the effects of the damaged compound particles on low cycle fatigue life.

Figure 2:
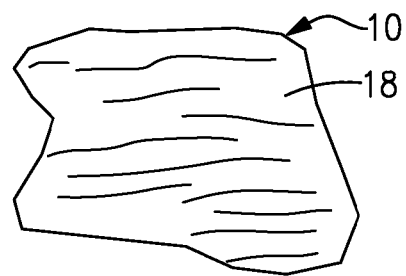
FIG. 2 is a simplified view of the substrate surface shown in FIG. 1 subsequent to removing the damaged compound particles.

FIG. 2 illustrates the component 10 with a finished surface 18 in which the damaged carbides and/or oxides 16 have been removed. In one example, a predetermined amount of the substrate surface 12 is removed subsequent to machining in an amount that corresponds to an average damaged or cracked compound particle size. In the example of cracked carbides, at least 0.0006 inch (0.01524 mm) is removed so that a new substrate surface substantially free of new damaged compound particles is produced.

Figure 3:
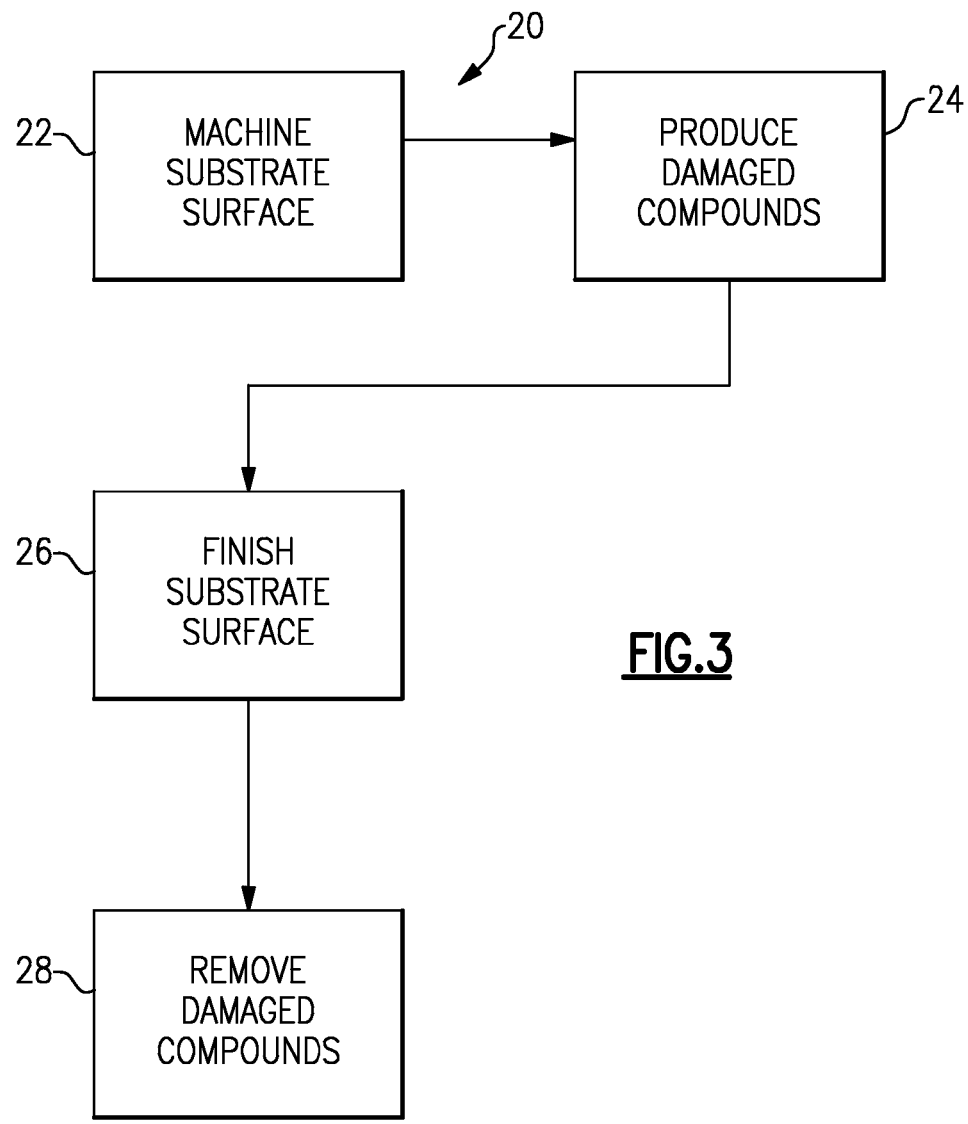
FIG. 3 is an example manufacturing method of removing damaged compound particles from a machined substrate surface.

An example manufacturing method 20 is shown in FIG. 3. The substrate surface is machined, as indicated at block 22, which results in damaged compound particles, as indicated at block 24. The machined substrate surface is finished to remove the predetermined amount of substrate, as indicated at block 26. One example substrate surface finishing process is to mechanically work the substrate surface with an abrasive media. In one example, the component is placed in a barrel, such as a Sutton barrel, with an abrasive media, such as No. 10 fused aluminum oxide. In one example, the abrasive media and component is suspended in water containing a detergent and a corrosive inhibitor. In one example process, the barrel is vibrated at about 320 oscillations per minute for about ninety minutes to remove at least 0.0006 inch (0.01524 mm) of substrate surface. The abrasive media removes the damaged compound particles and some of the substrate without producing any amount of new damaged compounds, as represented by block 28.

Parameters such as the speed, shape and size of the media and the duration for which the component is exposed to the media affect the amount of material removed from the substrate surface. The desired parameters can be empirically determined for each application. Removing the damaged compound particles eliminates sites that are susceptible to fatigue cracks, which extends the low cycle fatigue life of the component.

Other material removal processes can be used to improve low cycle fatigue life if, for example, the substrate surface is removed in an amount corresponding to the median damaged intermetallic compound particle size.

Although example embodiments have been disclosed, a worker of ordinary skill in this art would recognize that certain modifications would come within the scope of the claims. For that reason, the following claims should be studied to determine their true scope and content.

What is claimed is:

1. A method of manufacturing a component comprising the steps of:

providing a substrate surface having damaged compound particles; and removing the damaged compound particles from the substrate surface without producing a substantial amount of new damaged compound particles in the substrate surface wherein the removing step includes cutting a predetermined amount of the substrate surface to produce a new substrate surface free from additional damaged compound particles.

2. The method according to claim 1, wherein the providing step includes machining a substrate surface, and the damaged compound particles include brittle compound particles susceptible to cracking during said machining.

3. The method according to claim 2, wherein cutting includes lathe turning the substrate surface.

4. The method according to claim 2, wherein cutting includes at least one of drilling, boring, broaching, reaming, and milling the substrate surface.

5. The method according to claim 2, wherein the damaged compound particles includes at least one of a cracked carbide and a cracked oxide.

6. The method according to claim 5, wherein the substrate surface includes at least one of a nickel alloy and a steel alloy.

7. The method according to claim 1, wherein the predetermined amount corresponds to an approximate median size of the damaged intermetallic compound particles.

8. The method according to claim 7, wherein the predetermined amount is at least 0.0006 inch.

9. The method according to claim 8, wherein the removing step includes mechanically working the substrate surface with an abrasive media.

10. The method according to claim 9, wherein the removing step includes arranging the substrate surface and the abrasive media in a barrel suspended in a liquid.

11. The method according to claim 8, wherein the predetermined amount is removed by low-stress grinding.

12. A method of manufacturing a component comprising the steps of:
providing a substrate surface including at least one of a nickel alloy and a steel alloy having at least one of damaged carbides and damaged oxides;
removing a predetermined amount of material from the substrate surface that includes the at least one of the damaged carbides and damaged oxides, wherein the predetermined amount corresponds to an approximate median size of the damaged intermetallic compound; and
producing a new substrate surface free of additional damaged carbides or damaged oxides.

13. The method according to claim 12, wherein the predetermined amount is at least 0.0006 inch.

14. The method according to claim 13, wherein the removing step includes mechanically working the substrate surface with an abrasive media.

* * * * *